US010735423B2

(12) United States Patent
Boodaei

(10) Patent No.: US 10,735,423 B2
(45) Date of Patent: Aug. 4, 2020

(54) USER AUTHENTICATION AND AUTHORIZATION SYSTEM FOR A MOBILE APPLICATION

(71) Applicant: Michael Boodaei, Givatayim (IL)

(72) Inventor: Michael Boodaei, Givatayim (IL)

( * ) Notice: Subject to any disclaimer, the term of this patent is extended or adjusted under 35 U.S.C. 154(b) by 260 days.

(21) Appl. No.: 15/604,991

(22) Filed: May 25, 2017

(65) Prior Publication Data

US 2018/0343256 A1 Nov. 29, 2018

(51) Int. Cl.
*H04L 29/06* (2006.01)
*G06F 21/62* (2013.01)
*G06F 21/31* (2013.01)
*H04W 12/06* (2009.01)

(52) U.S. Cl.
CPC .......... *H04L 63/0892* (2013.01); *G06F 21/31* (2013.01); *G06F 21/629* (2013.01); *H04L 63/0807* (2013.01); *H04L 63/105* (2013.01); *H04L 63/20* (2013.01); *H04L 63/08* (2013.01); *H04W 12/06* (2013.01)

(58) Field of Classification Search
CPC ............. H04L 63/0892; H04L 63/0807; H04L 63/105; H04L 63/20; H04L 63/08; G06F 21/31; G06F 21/629; H04W 12/06; H04W 88/02
USPC ............................................................. 726/1
See application file for complete search history.

(56) References Cited

U.S. PATENT DOCUMENTS

| 8,650,405 | B1 * | 2/2014 | Dotan | G06F 21/31 |
| | | | | 713/182 |
| 9,703,978 | B2 * | 7/2017 | Lim | G06F 21/604 |
| 2006/0242685 | A1 * | 10/2006 | Heard | G06F 21/577 |
| | | | | 726/3 |
| 2007/0079357 | A1 | 4/2007 | Grinstein | |
| 2011/0225625 | A1 * | 9/2011 | Wolfson | H04L 63/08 |
| | | | | 726/1 |
| 2012/0023558 | A1 * | 1/2012 | Rafiq | H04L 63/08 |
| | | | | 726/6 |

(Continued)

FOREIGN PATENT DOCUMENTS

WO WO 2014/130141 A1 8/2014

OTHER PUBLICATIONS

Extended European Search Report, European Patent Application No. 18174290.9, dated Sep. 27, 2018, 8 pages.

*Primary Examiner* — Eleni A Shiferaw
*Assistant Examiner* — Sakinah White Taylor
(74) *Attorney, Agent, or Firm* — Fenwick & West LLP

(57) ABSTRACT

A system for enforcing a security policy on an application stored at a mobile device has an application at the device provided with software code for issuing a request for authenticating a user, and a security enforcement unit; an authentication agent at the device, which is separate from the application, and which is configured with an authentication data collecting unit for collecting authentication data upon receipt of the request for user authentication from the application, and for conveying the collected authentication data to an authentication-authorization server; and an authentication-authorization server for receiving the collected authentication data, evaluating the same, and issuing an enforcement level signal which is conveyed to the security enforcement unit. Upon receipt of the enforcement level signal, the security enforcement unit accordingly applies a security level at the application.

12 Claims, 4 Drawing Sheets

(56) References Cited

U.S. PATENT DOCUMENTS

| | | | |
|---|---|---|---|
| 2012/0167188 A1 | 6/2012 | Poornachandran et al. | |
| 2013/0132854 A1* | 5/2013 | Raleigh | G06F 3/0482 |
| | | | 715/738 |
| 2013/0347092 A1* | 12/2013 | McBrearty | G06F 21/31 |
| | | | 726/9 |
| 2014/0109178 A1* | 4/2014 | Barton | G06F 9/45533 |
| | | | 726/1 |
| 2014/0157351 A1* | 6/2014 | Canning | H04L 63/20 |
| | | | 726/1 |
| 2014/0189807 A1 | 7/2014 | Cahill et al. | |
| 2015/0100356 A1* | 4/2015 | Bessler | G06Q 30/01 |
| | | | 705/7.12 |
| 2016/0006711 A1 | 1/2016 | Gage et al. | |
| 2017/0118249 A1* | 4/2017 | Motukuru | H04L 63/20 |

* cited by examiner

USER AUTHENTICATION AND AUTHORIZATION SYSTEM FOR A MOBILE APPLICATION

FIELD OF INVENTION

The invention relates in general to systems for authenticating a user who operates a mobile application, and for authorizing functionalities within the mobile application based on said authentication.

BACKGROUND OF THE INVENTION

Mobile applications relating to E-commerce, for example, banking and selling applications, require a very high certainty of authentication of the identity of the user. In many cases, the identity of the user and the level of certainty that the user is indeed the one as presented, directly affect the freedom which is given to the user the application owner to perform functionalities while using the application. For example, a user who is known to be reliable, and whose authenticity has been verified in a highest level of certainty may be allowed to perform the full list of functionalities within application, but in another situation, if the authorizing system (which is managed by the owner of the application) faces difficulties in authenticating the same user in the highest level of certainty, the same user may be allowed to perform a limited or null functionalities within the same application. The term "functionalities" may refer, for example, to (a) a permission to access specific data; (b) a permission to store specific data; (c) a permission to purchase a specific product; (d) a permission to perform money transfer; etc. In all said examples different levels of permissions are typically granted to the user based on his credibility, as well as on the level of certainty concluded that the user is indeed the one which is presented.

Typically, when a user tries to access a certain application, for example, to view private information, to make payment, or to file a form, the application needs to determine whether to approve or deny the access. To allow or reject the user's request for performing such an action, the application applies a security policy. A crucial input to this security policy is the defined identity of the user.

To define a user identity, a system manager typically builds a database with respect to each registered user. For each user, the database contains a list of parameters or challenges that must be submitted by the user, such as a username, password, account number, etc. Upon receipt of the user's response and verification against the database, the system either confirms the user's identity and thus grants him the requested permissions, or it denies the request. In some cases, when some level of uncertainty exists with respect to the identity of the user relative to the functionalities he requests to perform, the prior art systems requests the user to fulfill more challenges (such as answering private questions, responding to an SMS which is sent to him, correctly answering a captcha (to determine that he is not a machine), etc. In cases that the authenticity of the user remains in doubt, the prior art systems typically limit the user permissions to perform functionalities that are granted to him.

As noted, the authentication of the user, as well as the grant of permissions to the user to functionalities of the application involves checking of a security policy. The information needed to support a policy decision may be distributed across multiple resources such as databases, directories, risk engines, the user's mobile device or computer, and the application itself. The decision may also be dependent on the ability of the user and/or the application to successfully perform one or more actions, such as authenticating using a specific authenticator, approving a legal disclaimer, or taking a photograph. Such actions may be enforced by multiple enforcement points such as the application itself, the user's mobile device or computer, and other software agents and systems.

The prior art systems for authenticating users of mobile applications and for granting permissions accordingly typically comprise an authentication server at the owner's side (for example, the bank, the selling company, etc.,). The authentication server communicates directly with the respective application at the users' mobile device.

During the recent years, more techniques for authenticating users of mobile applications have become available. Several of said new authentication techniques require the user's intervention (such as a fingerprint module, a camera for conveying the user's face to the remote authentication server, an SMS module for sending SMS to the user, etc.). Other of said authentication techniques are performed in a manner which is transparent to the user (such as verification of the device IP against an expected IP, verification between the user's current location and his expected location, verification of the present behavior of the user, such as, the time of communication against the time in which the same user typically establishes communication, etc.). However, even with the new techniques that are now available there are still fake users that overcome the existing challenges, causing very significant damages to the owner.

In another aspect, security policy requirements pertaining to establish user identities may change based on new security threats, new user experience requirements, and newly developed data repositories and actions. As typically security administrators working (for the owner) at the authentication server side cannot easily modify the applications themselves, they are still required to update in a central manner the respective security policies in order to address new threats, and these updates have to be done in a manner which is transparent to the user.

A user authentication policy may consider and collect many parameters pertaining to the user's identity and the current session with the application. Such evidence parameters may include the following factors:
1. Biometric features of the user such as fingerprints and face structure;
2. The location of the user;
3. The network from which the user accesses the system;
4. The device from which the user accesses the system;
5. The names and types of applications that reside or are activated at the user's device;
6. The type, if at all exists, of an anti-virus protection that exists at the user's device;
7. The one or more mobile operators' platforms on which the user communicates;
8. Whether the communication is made over a secured channel or not;
9. The ability of the user and/or the application to successfully perform one or more challenges; e.g.:
    a. Providing a password known to the user
    b. Drawing a pattern known to the user
10. The ability of the user to take and send a photograph;
11. Proof that the user is in possession of a device previously associated with him, e.g. by means of:
    a. Typing a one-time-password sent to the device;
    b. Approving a request securely sent to a specially crafted application;

12. Behavioral characteristics of the user; such as:
    a. Typical time-of-day and day-of-week where transactions are executed;
13. The type of transactions that are typically carried out by the user.

In order to comply with said variety of authentication parameters, or authentication means that are introduced, it is necessary to frequently upgrade the mobile application at the user's side. However, each of such upgrade or update of the application to include additional authentication means is a complicated task, that should consider various of security issues, therefore requiring a thorough testing and debugging of the mobile application prior to the upgrade. In some cases, the debugging and testing of an upgraded application to include a new authentication technique may take several months. Such a long period significantly limits the flexibility of the owner in taking urgent measures when new threats are detected, or when the circumstances change for a specific user.

It is therefore an object of the present invention to provide a new structure for authenticating users of mobile applications.

It is another object of the present invention to provide an authentication system which significantly simplifies introductions of new measures for authenticating users of mobile applications.

It is another object of the present invention to significantly shorten the period until updates to an authentication policy of a mobile application can be effected.

It is another object of the present invention to provide an authentication system which enables greater flexibility in defining and effecting amendments to an authentication policy, in a manner which does not require any modification to the mobile application.

Other objects and advantages of the invention will become apparent as the description proceeds.

SUMMARY OF THE INVENTION

The invention relates to a system for enforcing a security policy on an application stored at a mobile device, which comprises: (a.) an application at said device which comprises: (a.1) software code within the application for issuing a request for authenticating a user; and (a.2) a security enforcement unit; (b) an authentication agent at said device, which is separate from the application, and which comprises: (b.1) an authentication data collecting unit for collecting authentication data upon receipt of said request for a user authentication from the application, and for conveying said collected authentication data to an authentication-authorization server; and (c) an authentication-authorization server for receiving said collected authentication data, evaluating the same, and issuing an enforcement level signal which is conveyed to said security enforcement unit; wherein, upon receipt of said enforcement level signal, said security enforcement unit accordingly applies a security level at said application.

In an embodiment of the invention, said authentication enforcement server further conveys to said authentication agent an authentication definition signal, said signal being used by the agent to select one or more types of authentication data for collection.

In an embodiment of the invention, said data which is conveyed between one or more of the application, the authentication agent, and the authentication-authorization server, are token based.

In an embodiment of the invention, said server further comprises a database, and said evaluation by the server uses data which is pre-stored at the database.

In an embodiment of the invention, said authentication data collecting unit at the agent collects data from one or more of the user, the application, the device, and external resources.

In an embodiment of the invention, said authentication-authorization server bases its evaluation, among others, on data that it collects by its own resources.

In an embodiment of the invention, said authentication agent at the device is a software library code which is linked into the application.

DETAILED DESCRIPTION OF PREFERRED EMBODIMENTS OF THE INVENTION

Figure 1A:
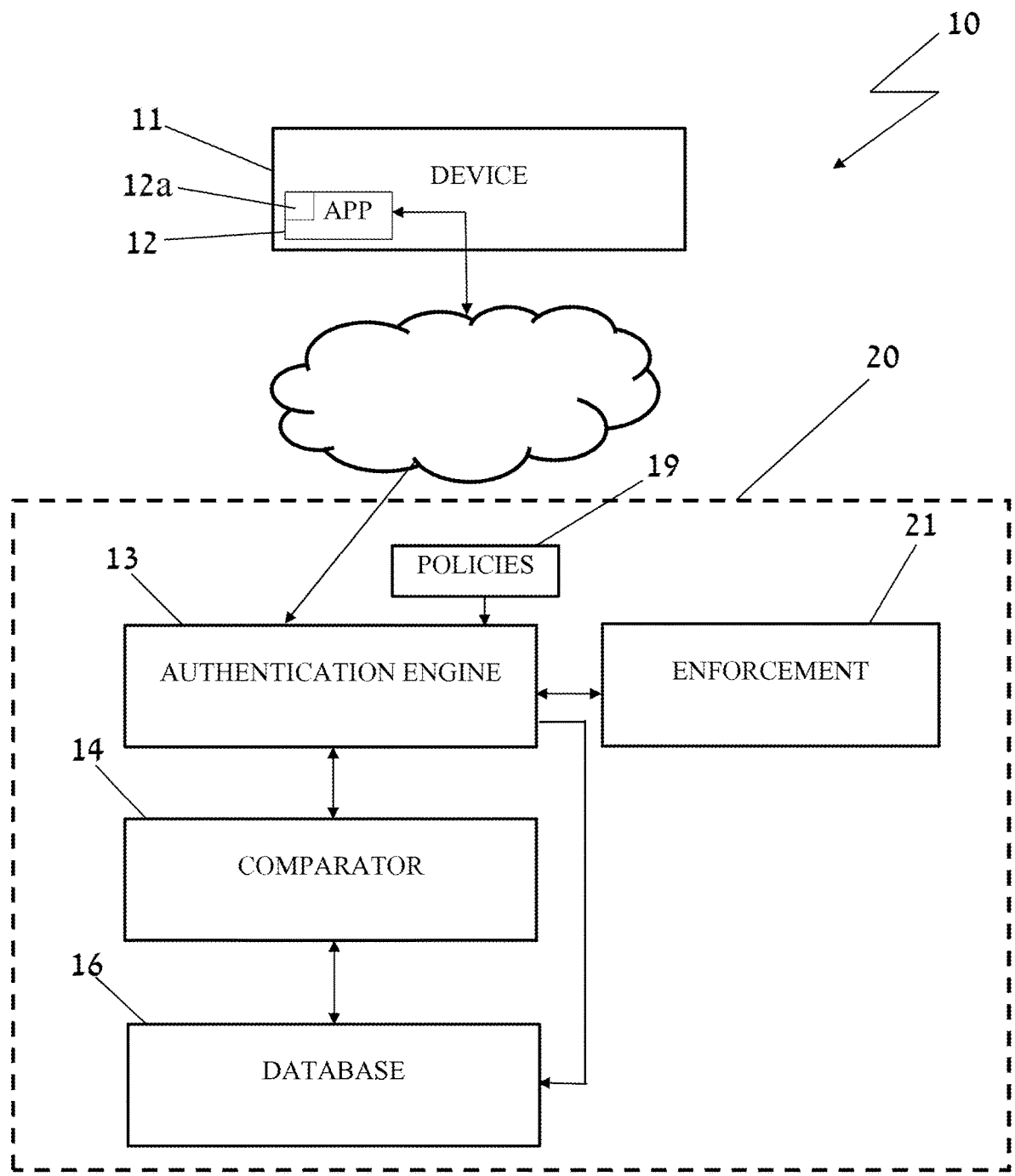
FIG. 1A illustrates a typical prior art policy authentication-authorization scheme.

A typical prior art policy authentication-authorization scheme 10 is shown in FIG. 1A. By a user initiating an application 12 that resides, for example, within a mobile phone 11 (hereinafter also referred to as "device"), and in order to activate functionality of the application, the user is requested to submit some basic data, such as, one or more of: (a) an account number; (b) a username; (c) a user's password; (d) a user's email; etc. In some cases, an authorization engine 13 at the remote authentication-authorization server 20 to which the user wishes to gain access and to activate functionalities may also instruct the application 12 to collect additional data with respect to the user, to his device, or to the environment in which the device currently operates. In order to collect said data, the application is provided with an internal authentication data collection unit 12a for (a) collecting the personal data as provided by the user (hereinafter, "personal data"); (b) activating internal modules within the application or external modules (not shown) within the mobile device to collect additional data relating to the user, and to the environment in which the device operates (hereinafter, "additional data"). The cumulative "personal data" and additional data" will be referred herein as "authentication data". Such authentication data may include, for example, one or more of:

1. Biometric features of the user such as fingerprints and face structure;
2. The location of the user;
3. The network from which the user accesses the system;
4. The device from which the user accesses the system;
5. The names and types of applications that reside or are activated at the user's device;
6. The type, if at all exists, of an anti-virus protection that exists at the user's device;
7. The one or more mobile operators' platforms on which the user communicates;
8. Whether the communication is made over a secured channel or not;

9. The ability of the user and/or the application to successfully perform one or more challenges; e.g.:
   a. Providing a password known to the user
   b. Drawing a pattern known to the user
10. The ability of the user to take and send a photograph;
11. Proof that the user is in possession of a device previously associated with him, e.g. by means of:
    a. Typing a one-time-password sent to the device;
    b. Approving a request securely sent to a specially crafted application;
12. Behavioral characteristics of the user; such as:
    a. Typical time-of-day and day-of-week where transactions are executed;
13. The type of transactions that are typically carried out by the user.

Upon the insertion by the user of the personal data to the application 12, as well as the collection of the additional data, the application 12 sends the authentication data to the remote authorization engine 13 at authentication-authorization server 20. The authorization engine 13, in turn, conveys the authentication data to comparator 14. Comparator 14 compares the authentication data against a respective pre-stored authentication data for same user at database 16. Upon a successful comparison by comparator 14, and determination of a level of certainty with respect to the user's identity, the authorization engine 13, authorizes a security policy from policy storage 19, and activates enforcement 21 of that policy. Enforcement data with respect to the selected policy is conveyed directly to application 12 and enforced there.

As noted, the authentication data collection unit 12a is integrated within the application 12, and is in fact a part of application 12. Therefore, any update to the user authentication policy requires an upgrade of the application 12 itself. Typically, a component which corresponds to the authentication data collection unit 12a also exists at the server's side. So, in such a case both components should be upgraded. An application upgrade is a relatively complex process, which may affect various security issues regarding to the operation of the application. Therefore, each of such upgrade requires performance of a thorough debug and check of the entire application, particularly its interaction with the external domain, a process which in some cases takes several months. For example, the adding to an application the feature of checking a fingerprint of a user and sending the results to the authentication engine may involve a process of several months until completion of the security check and debugging.

Figure 1B:
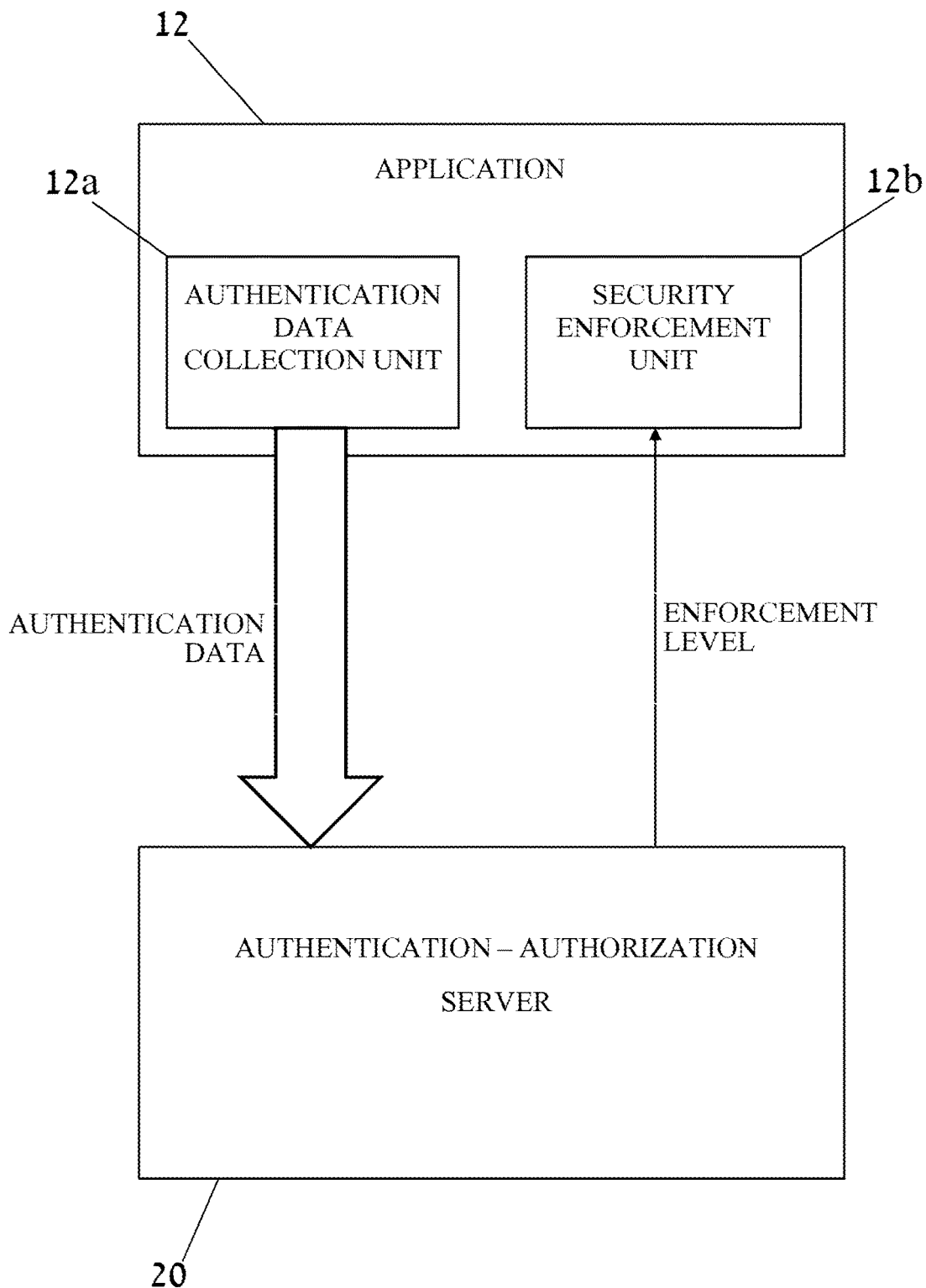
FIG. 1B describes some aspects of the prior art system of FIG. 1A.

FIG. 1B shows additional aspects of the prior art system of FIG. 1A. Typically, when a necessity for authentication arises, the authentication data collection module 12a which, as said is located within application 12, collects the authentication data data (as defined above) that are necessary for the authentication. When said authentication data is available, it is transferred to the authentication-authorization server 20. As described above, server 20 evaluates the authentication data, selects a suitable enforcement level, and sends the enforcement level (enforcement data) to the application 12. The enforcement data is received at a security enforcement unit 12B within application 12. Having the enforcement data, the security enforcement unit enforces a respective level within application 12.

Figure 2A:
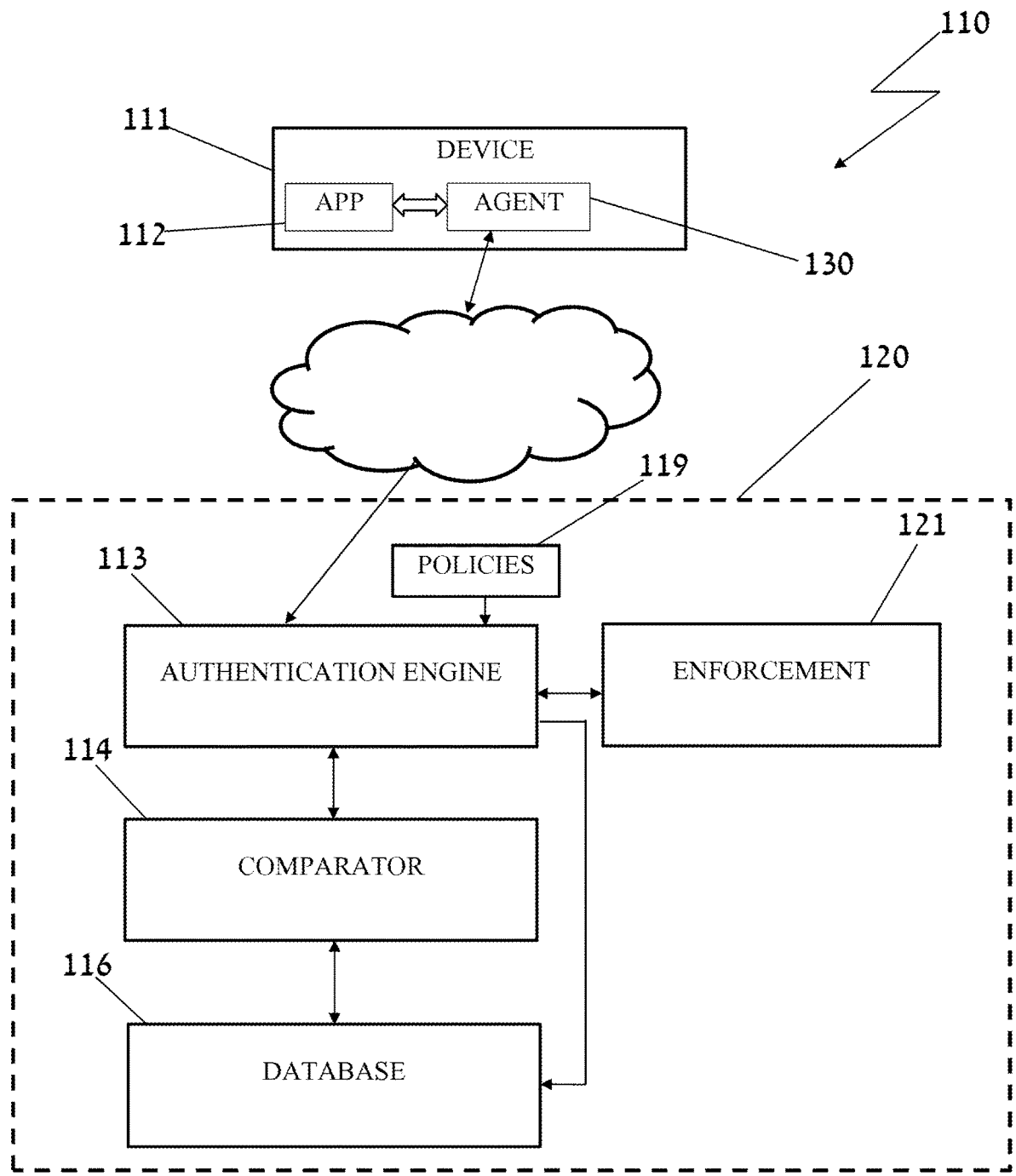
FIG. 2A generally shows the structure of a system according to an embodiment of the present invention.

FIG. 2A shows a structure of an authentication-authorization system 110 according to an embodiment of the present invention. The structure of the system 110 of the invention is somewhat similar to the system of FIG. 1A, however, while in the prior art system of FIGS. 1A and 1B the authentication data collection unit 12a is integrated within the application 12, the system now comprises at the mobile device an authorization agent 130, which is a software component decoupled from the rest of the application 12, and the authentication data collecting unit (not shown in FIG. 1A) is now located within agent 130. The task of authentication data collection is now entirely removed from the application code, and is now performed by the authentication agent 130, which in fact serves as a broker between the application 112 and the authentication-authorization server 120. The authentication agent 130 is preferably an SDK-type software which is installed at the mobile device together with the application. The authentication agent 130 has, among other functionalities, capabilities of data collection, such as collecting GPS location from the user's endpoint device, collection of fingerprint data from a fingerprint module within the device, and action capabilities such as enabling authenticators and generating encryption keys in the user's device.

As will become apparent, the fact that the authentication agent 130 is an entirely separate component from the application 12 enables much more flexibilities in deployment of updated security policies compared to the prior art systems, without any requirement for modification of the application itself.

Figure 2B:
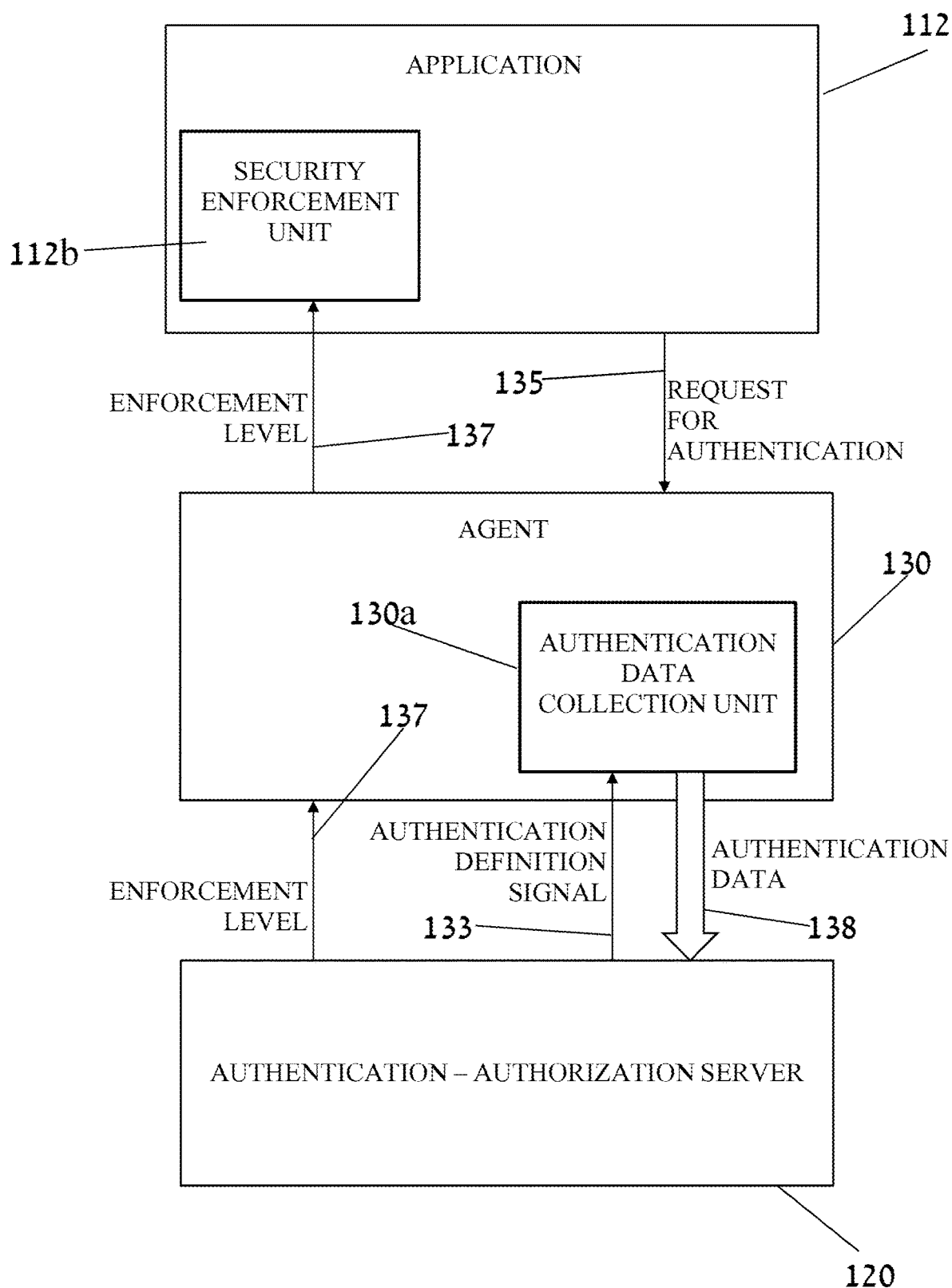
FIG. 2B describes some aspects of the system of the invention, as shown in FIG. 1A.

FIG. 2B shows additional aspects of the system of the invention. Typically, when a necessity for a user authentication arises at the application, the application issues a request for authentication, which is conveyed to the authentication agent 130. The authentication agent 130 includes many options for collecting authentication data (personal data, and additional data). Those optional collections that are activated at agent 130 are defined by an authentication definition signal 133 which is issued by the authentication-authorization server 120, and is sent from time to time to agent 130 in order to update those authentication data collection interfaces that are activated within agent 130. The authentication agent 130 comprises the authentication data collection software unit 130a, which is similar to the authentication data collection unit 12a, which according to the prior art is located within the application 12. However, rather of being located within the application, the authorization data collection software unit 130a is now located within the authentication agent 130. Moreover, the authentication data collection unit 130a may now include many optional collection interfaces, that only some of them are activated, depending on the authentication definition signal 133. Upon receipt of a request for authentication signal, authentication data collection software unit 130a collects the authentication data (as defined above) that are necessary for the authentication. When said authentication data is available, it is conveyed to the authentication-authorization server 120 via a network connection of the mobile device. Server 20, in turn, evaluates the authentication data, selects a suitable enforcement level, and sends the enforcement level (enforcement data) 137 to the application 112 via the agent 130, or directly. The enforcement data is received at a security enforcement unit 112B within application 112. Having the enforcement data, the security enforcement unit 112B enforces a respective security level within application 112.

EXAMPLE

The following flow exemplifies the interaction between the application 112, the authentication agent 130, and the authentication-authorization server 120:

1. A user tries to access the application 112, or to perform a certain functionality.
2. The application 112 creates a Policy Request (request for authentication 135)
3. The application 112 may attach data to the policy request. For example, service category, user type, user identifier, etc. There is no limitation to the amount and type of data that the requesting application may attach to a policy request. This data may later be used by the authentication-authorization server 120 to make policy decisions.
4. The requesting application 112 sends the policy request to the authentication agent 130.
6. The authentication agent 130 serves as a broker between the requesting application 112 and the authentication-authorization server 120. The authentication agent 130 collects the authentication data, and sends the same to the authorization server 120, and waits for a response.
7. Once the authentication-authorization server 120 gets the authentication data 138, it performs a flow of conditions as defined by the policy administrator using a programmable language or a graphical interface. These conditions may involve inspection of 4 types of data:
    a. Data that was added by the requesting application 112 to the authentication data, such as user type and service type.
    b. Data that is stored inside the authentication authorization server's database 116, such as the last attempt made by this user to access the requested service.
    c. Data that is collected by the authentication agent 130, such as end-user device type, IP address, and device location.
    d. External data that is provided by resources external to the authentication-authorization server 120, such as databases of third party systems, for example, the user's phone number and the user's email address.
8. If the authentication-authorization server 120 needs additional data which is stored at the authentication agent 130, or which can be extracted by the authentication agent, the authentication authorization server 120 issues a request for this data. The authentication agent collects the requested data and sends it back to authentication-authorization agent 120.
9. If the authentication-authorization agent 130 needs to access data stored in an external system (not shown), it uses a relevant configured interface to call that system and get this data.
10. Once authentication-authorization server 120 goes through a flow of conditions (namely, comparison between the various of the received or obtained data as compared with the data in database 116), it may reach an action. There are 4 types of actions that are configured:
    a. An authentication agent action, such as generating a private key at the user's device 111, or (for example) calling the device's fingerprint scanner, or calling a specific API at the mobile device 111.
    b. An external system action, such as storing information in external system, or sending an SMS message to the device 112 using an external system.
    c. Requesting application action, such as asking the user for a password, or displaying a disclaimer to the user and asking the user to approve.
    d. Internal authentication-authorization server's action, such as storing information in the database 116, or activating a process within the authentication authorization server 120.
11. Based on the type of action, the authentication-authorization server 120 performs the following:
    a. Issues and authentication agent's 130 action: the authentication-authorization server 120 replies to the authentication agent 130 with the action and waits for the authentication agent to execute the action and return back to the authentication-authorization server the result of the action, such as success or failure.
    b. Issues an external system action: The authentication-authorization server 130 calls an external system using a relevant interface, activates the action, and waits for the external system to reply with a result of the action.
    c. Issues a requesting application action: the authentication-authorization server 120 returns back to the requesting application 112 via the authentication agent 130 a requesting application action, and waits for a result.
12. Once the authentication-authorization server 120 gets back the result of the issued action, respectively, it continues the flow, which may comprise more conditions and/or actions. This flow can now refer to the result of the previous action.
13. At the end of the policy flow, the authentication-authorization server 120 issues a special action called Generate Token. This action concludes the policy execution process (enforcement level). It generates a token in a JWT or any other format which is sent to the authentication agent's 130, which in turn conveys a respective enforced policy to the application 112. The token consists of the decisions that were taken following the process that was performed.
14. As noted, the token is sent by authentication-authorization server 120 to the requesting application 112, either via the authentication agent 130, or directly.
15. Given the decisions, as conveyed by the token, the authentication agent requesting application 112 concludes the policy execution process.

As discussed above, in the prior art the collection of authentication data is performed by the authentication data collection unit 12a, which is located within the application 12. For example, if the security policy requires both password and fingerprints of the user to activate the application, both said collections are performed from within the application 12. Any change for that requirements requires an upgrade procedure of the application. In contrary, according to the present invention the authentication data collection unit 130a is located within the authentication engine 130, which serves as a broker between the application and the authentication-authorization server 120. Typically, the authentication engine 130 contains many types of interfaces for collecting data, not all of them are active (depending authentication definition 133). When a need for a change in the policy arises with respect to a specific user (for example, adding a requirement of fingerprints, which is currently optional), the authentication-authorization server 120 simply conveys an authentication definition signal to the authentication agent 130, which immediately effects such change of policy. This change of policy (in terms of data collection) is then enforced by the authentication agent 130. As shown, in the manner as described, updates to the policy become much more flexible, while updates to the authentication agent 130 may be performed rarely (as it typically contains many data collection interfaces, that typically only few of them are in fact activated). As said, when a necessity arises for effecting a change of policy, a respective authentication definition signal is sent to the authentication agent 130, and this change is in fact applied on the security of the application 112 immediately.

In an embodiment of the invention, a single authentication agent 130 may serve a plurality of applications within the device 111.

While some embodiments of the invention have been described by way of illustration, it will be apparent that the invention can be carried out with many modifications variations and adaptations, and with the use of numerous equivalents or alternative solutions that are within the scope of persons skilled in the art, without departing from the spirit of the invention or exceeding the scope of the claims.

The invention claimed is:

1. A system for enforcing flexibly updatable execution in security policy on an application stored at a mobile device, which comprises:
   a. an application at said mobile device which comprises: software code within the application for issuing a request for authenticating a user; and
   a security enforcement unit;
   b. an authentication agent at said mobile device, which is separate from the application, and which comprises:
   an authentication data collecting software unit for collecting authentication data upon receipt of said request for user authentication from the application, and for conveying said collected authentication data to an authentication-authorization server via a network connection provided by said mobile device; and
   a plurality of activatable interfaces, each of which is adapted to collect a different type of authentication data; and
   c. said authentication-authorization server for receiving said collected authentication data, evaluating the same, and issuing an enforcement level signal which is conveyed to said security enforcement unit, wherein, upon receipt of said enforcement level signal, said security enforcement unit accordingly applies a security level at said application, wherein said authentication-authorization server is operable to:
      (1) perform a multi-stage iterative evaluation operation that is responsive to the authentication data which has been collected by said authentication agent and received by said authentication-authorization server in a previous stage or is responsive to an action performed by said authentication agent in a previous stage and commanded by said authentication-authorization server; and
      (2) effect in runtime a change in execution of policy in response to evaluation of said collected authentication data without upgrading said application by:
   i. conveying via said network connection to said authentication agent an authentication definition signal corresponding to said change in execution of policy, said authentication definition signal defining which of said interfaces are to be activated by said authentication agent and which corresponding one or more types of authentication data are to be collected by said authentication data collecting unit; and
   ii. conveying said enforcement level signal to said security enforcement unit immediately following conveying said authentication definition signal.

2. The system according to claim 1, wherein data which is conveyed between one or more of: the application, the authentication agent, and the authentication-authorization server, is token based.

3. The system according to claim 1, wherein the authentication-authorization server further comprises a database, and said evaluation by the authentication-authorization server uses data which is pre-stored at the database.

4. The system according to claim 1, wherein said authentication data collecting software unit at the agent collects data from one or more of: the user, the application, the device, and external resources.

5. The system according to claim 1, wherein said authentication-authorization server bases its evaluation, among others, on data that it collects by its own resources.

6. The system according to claim 1, wherein said authentication agent at the device is a software library code which is linked into the application.

7. The system according to claim 1, wherein the authentication-authorization server, while commanding the action to be performed in the previous stage of the multi-stage iterative evaluation operation, is operable to issue a request to the authentication agent to collect additional authentication data after receiving and evaluating said collected authentication data.

8. The system according to claim 7, wherein the authentication-authorization server, while commanding the action to be performed in the previous stage of the multi-stage iterative evaluation operation, is operable to issue an action to be executed by the authentication agent, by an external system, by the application or by the authentication-authorization server after receiving and evaluating the collected authentication data or additional authentication data.

9. The system according to claim 8, wherein the authentication-authorization server, while commanding the action to be performed in the previous stage of the multi-stage iterative evaluation operation, is operable to additionally evaluate the collected authentication data or additional authentication data or issue an additional action after receiving a result of the executed action.

10. The system according to claim 1, wherein the action performed by the authentication agent in a previous stage is a non-authentication action.

11. The system according to claim 1, wherein the authentication-authorization server is additionally operable to effect a change of policy without upgrading said application by:
   a) conveying, via said network connection to said authentication agent, an additional authentication definition signal corresponding to said change in policy, said additional authentication definition signal defining which of said interfaces are to be activated by said authentication agent and which corresponding one or more types of authentication data are to be collected by said authentication data collecting unit prior to performance of the multi-stage iterative evaluation operation; and
   b) conveying an additional enforcement level signal to said security enforcement unit immediately following conveying said additional authentication definition signal.

12. A system for enforcing flexibly updatable execution in security policy on an application stored at a mobile device, which comprises:
   a. an application at said mobile device which comprises: software code within the application for issuing a request for authenticating a user; and
   a security enforcement unit;
   b. an authentication agent at said mobile device, which is separate from the application, and which comprises:
   an authentication data collecting software unit for collecting authentication data upon receipt of said request for user authentication from the application, and for conveying said collected authentication data to an authentication-authorization server via a network connection provided by said mobile device; and a plurality of activatable interfaces, each of which adapted to collect a different type of authentication data; and c. said authentication-authorization server, for receiving said collected authentication data, evaluating the same, and issuing an enforcement level signal which is conveyed to said security enforcement unit, wherein, upon receipt of said enforcement level signal, said security enforcement unit accordingly applies a security level at said application, wherein said authentication-authorization server is operable to:

(1) perform a multi-stage iterative evaluation operation that is responsive to the authentication data which has been collected by said authentication agent and received by said authentication-authorization server in a previous stage; and (2) effect in runtime, a change of execution in policy in response to evaluation of said collected authentication data without upgrading said application by:

i. conveying, via said network connection to said authentication agent, an authentication definition signal corresponding to said change in execution in policy, said authentication definition signal defining which of said interfaces are to be activated by said authentication agent and which corresponding one or more types of authentication data are to be collected by said authentication data collecting unit; and ii. conveying said enforcement level signal to said security enforcement unit immediately following conveying said authentication definition signal.

\* \* \* \* \*